United States Patent [19]

Schwab

[11] Patent Number: 5,672,132
[45] Date of Patent: Sep. 30, 1997

[54] CONTINUOUSLY VARIABLE TRANSMISSION REGULATION PROCESS

[75] Inventor: Manfred Schwab, Tettnang, Germany

[73] Assignee: ZF Friedrichshafen AG, Friedrichshafen, Germany

[21] Appl. No.: 586,641

[22] PCT Filed: Jul. 19, 1994

[86] PCT No.: PCT/EP94/02372

§ 371 Date: Jan. 22, 1996

§ 102(e) Date: Jan. 22, 1996

[87] PCT Pub. No.: WO95/03191

PCT Pub. Date: Feb. 2, 1995

[30] Foreign Application Priority Data

Aug. 23, 1993 [DE] Germany .................. 43 24 810.0

[51] Int. Cl.[6] .................. B60K 41/22; F16D 48/02
[52] U.S. Cl. ...................................... 474/8; 192/103 F
[58] Field of Search ............... 474/8, 11; 477/38, 477/39; 192/103 R, 103 F

[56] References Cited

U.S. PATENT DOCUMENTS

| 4,433,594 | 2/1984 | Smirl .................. 474/12 X |
| 4,606,446 | 8/1986 | Watanabe .................. 192/103 R X |
| 4,665,773 | 5/1987 | Hiramatsu et al. .................. 477/39 |
| 4,829,221 | 5/1989 | Grunberg et al. . |
| 4,880,094 | 11/1989 | Ohkumo .................. 192/103 R X |
| 4,958,538 | 9/1990 | Yamashita et al. . |
| 4,969,545 | 11/1990 | Hayashi .................. 477/39 X |
| 5,006,092 | 4/1991 | Neuman et al. . |
| 5,074,166 | 12/1991 | Yamashita et al. .................. 477/39 |
| 5,098,345 | 3/1992 | Van Vuuren .................. 474/8 |
| 5,211,083 | 5/1993 | Hattori et al. .................. 477/39 |

FOREIGN PATENT DOCUMENTS 39 24 792 A1  11/1990  Germany .

*Primary Examiner*—Rodney H. Bonck
*Attorney, Agent, or Firm*—Davis and Bujold

[57] ABSTRACT

A process is proposed to regulate a continuously variable transmission (2) with a clutch (9). The slip torque of the clutch is cyclically or anticyclically determined and the intensity of the clutch thrust is compared with a characteristic curve. This comparison sets a correction value used for modifying the characteristic curve.

7 Claims, 2 Drawing Sheets

CONTINUOUSLY VARIABLE TRANSMISSION REGULATION PROCESS

The invention concerns a regulation process for a continuously variable transmission.

Continuously variable transmissions have a pair of tapered discs on the input and output shafts, respectively. Between said pair of tapered discs extends a belt, chain or link conveyor which winds around the input and output shafts. Each pair of tapered discs consists of a first tapered disc firmly connected with a shaft and a second tapered disc movable in an axial direction. The input power is transmitted by friction contact between the traction roller and the tapered discs. The axial position of the second disc is changed by a hydraulic control mechanism. The effective diameter of the traction roller and thus transmission ratio are changed thereby.

DE-OS 39 14 792 has disclosed a motor vehicle drive where a clutch is situated between an engine and a continuously variable transmission. The purpose of the clutch is to secure the tapered discs and the traction roller against torque shock loads. To this end, the clutch pressure is selected according to the speed and load in a manner such that the transmissible torque of the clutch is smaller than that of the traction roller on the tapered discs. In this design it is disadvantageous that the actual behavior of the clutch is not detected. Therefore, the clutch must be loaded with a substantially higher pressure for reasons of security.

The problem to be solved by the invention is to control the clutch according to its actual condition.

According to the invention, the problem is solved by the fact that during operation the actual slip torque of the clutch is cyclically or anticyclically determined, the intensity of the torque pressure is compared with a characteristic curve and the comparison establishes a correction value used for adapting the characteristic curve.

The slip torque of the clutch is determined by gradually lowering the actual clutch pressure from a first pressure level to a second pressure level. The second pressure level is reached when a slight speed difference, such as 50 revolutions, appears on the clutch. The difference of the first pressure level minus the second pressure level indicates by what amount the first pressure level is above the slip limit of the clutch. A correction value results from said difference. The original characteristic curve is modified using said correction value. An input variable of the characteristic curve is the torque on the clutch, a dependent variable of the characteristic curve is the clutch pressure.

The slip torque of the clutch is determined with a firm time beat or with preset operation conditions. The preset operation conditions can be, for example, load position, engine speed or combinations of said operation parameters.

The solution according to the invention offers the advantage of detecting parameters on the transmission behavior of the clutch. Parameters of the clutch are, for example, scattering of the friction values due to manufacturing tolerances, change of the friction value as function of the temperature, change of the friction value during the operating life of the transmission and the pulling-away torque of a sticking clutch.

In one development of the invention, it is proposed that the correction value be updated upon each detection of the slip torque. Suddenly changing parameters, such as temperature, are detected hereby.

In another development of the invention, it is proposed that when in a preset number of correction values, the correction value exceeds a first positive limiting value of the pressure or falls below a second negative limiting value of the pressure, the last correction value is deposited in a permanent memory. The advantage obtained hereby is that slowly changing parameters, such as a change of friction value during the operating life or serial scattering, are taken into account. By storing the last correction value in a battery-buffered RAM, for example, it is obtained that after new a start of the vehicle, the last correction value immediately enters in the computation of the clutch pressure.

It is further proposed that from a predetermined number of correction values a representative correction value is determined and deposited in a permanent memory. A representative correction value can be determined, for example, by formation of average values or mathematical filter algorithms. The advantage obtained hereby is that the fatigue strength of the differences and the plausibility of the correction values are tested.

Figure 1:
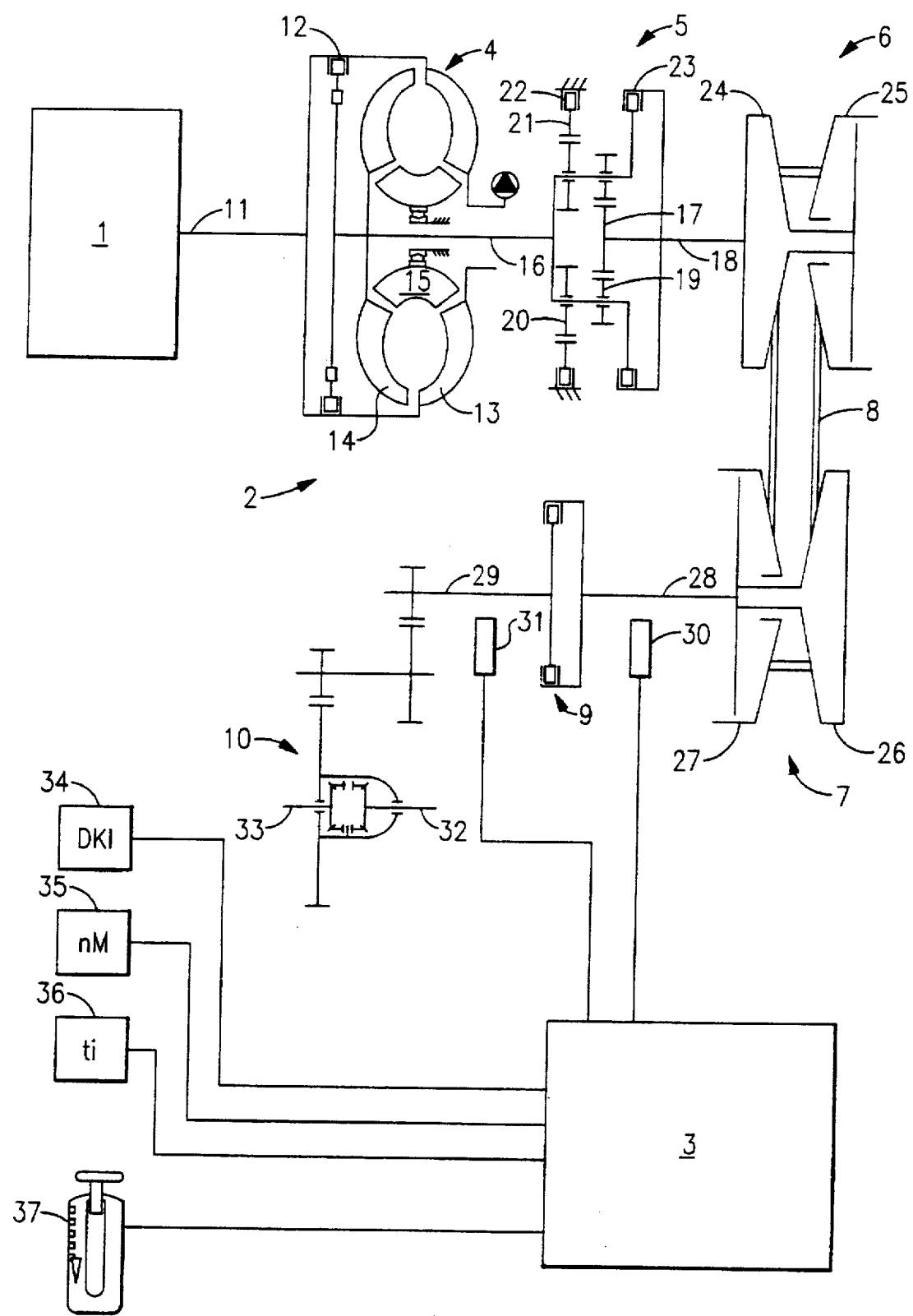
FIG. 1 is a system diagram of a continuously variable transmission.

FIG. 1 shows a system diagram of a continuously variable transmission. This system consists of an input unit 1, a continuously variable transmission 2 and an electronic transmission control 3. The continuously variable transmission 2, in turn, consists of the hydrodynamic converter assemblies 4, planetary reversing transmission 5, two tapered disc pairs 6 and 7 with a traction roller 8, a clutch 9 and a reduction step with a differential 10.

The continuously variable transmission 2 is driven via a shaft 11 by the input unit 1, such as an internal combustion machine. A hydrodynamic converter 4 is connected with the shaft 11 via a bridging clutch 12. As is known, the hydrodynamic converter 4 consists of an impeller 13, a turbine wheel 14 and a stator with a mechanical free-wheel unit 15. The hydrodynamic converter 4 serves the starting change of the generated torque of the input unit 1. The bridging clutch 12 bridges the hydrodynamic converter 4 at a clutch point, that is, a point where the pump and turbine torques have equal intensity. The bridging clutch 12 and the hydrodynamic converter 4 drive the planet spider 16. The planet spider 16 is part of the planetary reversing transmission 5. The planetary reversing transmission 5 is composed of: sun wheel 17 with sun-wheel shaft 18, a first planetary gear 19, a second planetary gear 20, a ring gear 21, the planet spider 16, a brake 22 and a clutch 23. The planetary reverse transmission 5 is driven by the planet spider 16. The planetary gears 19 and 20 are rotatably mounted on the planet spider 16. In the range of forward travel, the clutch 23 is engaged and the brake 21 disengaged. The power flow is thus via planet spider 16, clutch 23 to sun-wheel shaft 18. In a reverse gear range, the clutch 23 is disengaged and the brake 22 engaged. The ring gear 21 is thus firmly connected with the transmission case. The power flow is now a planet spider 16, planetary gear 19, sun wheel 17 with a reversal of the direction of rotation. The sun-wheel shaft 18 drives the first tapered disc pair 6. The latter is connected via a traction roller 8 with a second tapered disc pair 7. Each tapered disc pair consists of a first tapered disc 24 and 26 stationary in an axial direction and a second tapered disc 25 and 27 movable in axial direction. The power is transmitted by friction contact between the tapered disc and the traction roller. A change of the axial position of the second tapered disc 25 and 27 produces a change of the track radius of the traction roller and thus a change of the reduction ratio. A clutch 9 is connected with the second tapered disc pair 7 by shaft 28. Two speed sensors 30 and 31 detect the speed of the shaft 28 and of the shaft 29. The clutch 9 is an overload block. When engaged, the clutch 9 transmits the torque of the shaft 28 slip-free to the shaft 29 and further to a reduction step with a differential 10 and both output shafts 32 and 33. When the clutch 9 is disengaged the pressure level in the clutch is selected so that when torque peaks are introduced on the output side, the clutch starts to slip. Thereby the power transmission of the tapered disc to the traction roller 8 is kept free of torque peaks. An electronic transmission control 3 controls the continuously variable transmission 2 via a hydraulic instrument, not shown. Input signals of the electronic transmission control 3 are a throttle valve signal 34, an engine speed 35, an injection time 36, a signal of traveling position switch 37, a signal of the speed sensor 30 and a signal from speed sensor 31. The torque generated by the input unit 1 is computed, as known per se, in the electronic transmission control 3 from the two input signals engine speed 35 and injection time 36. Instead of the injection time 36, a signal from an electronic engine control, not shown, which represents the torque of the input unit 1 can also be used.

Figure 2:
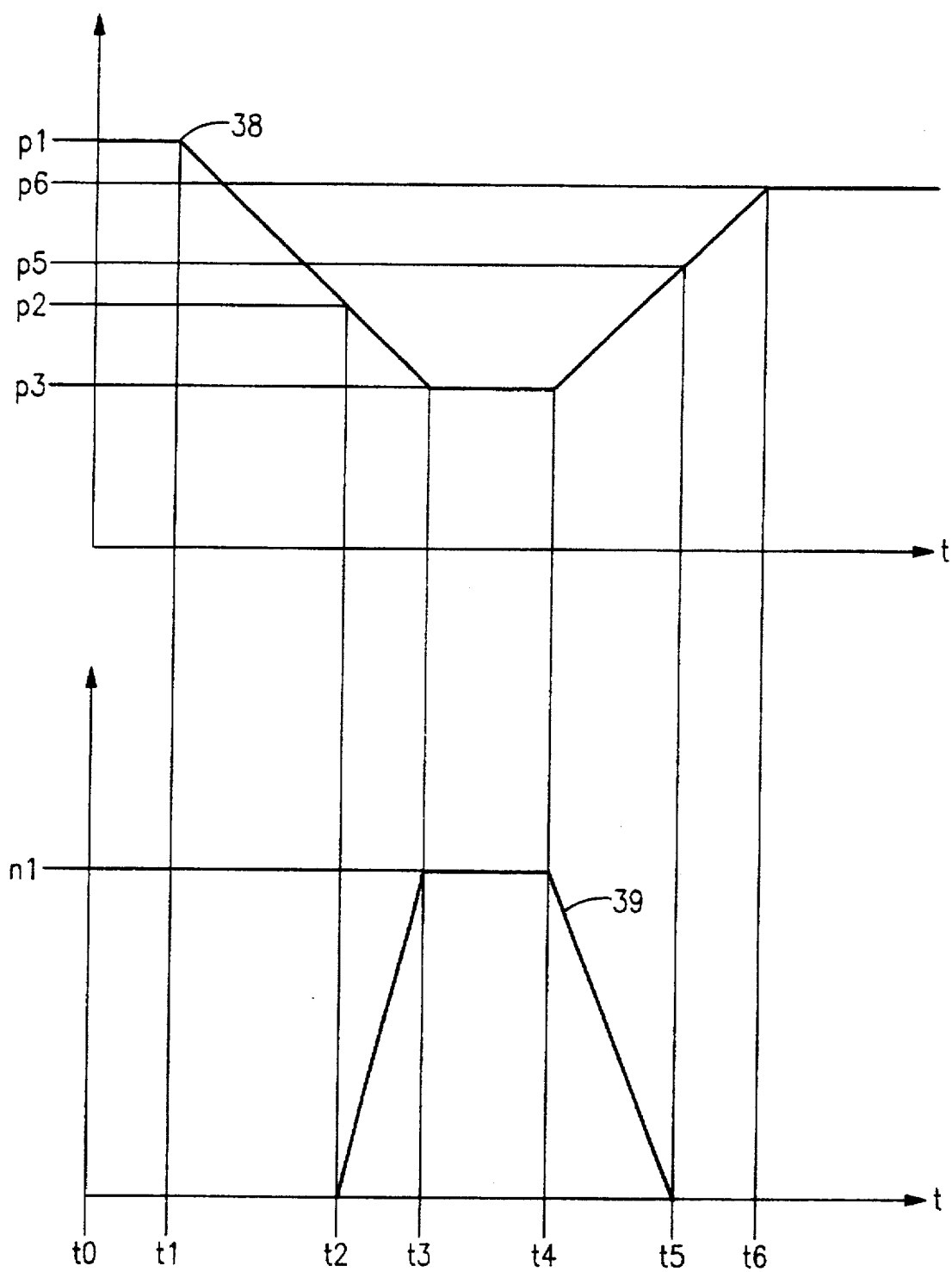
FIG. 2 is a clutch pressure-time and clutch slip-time diagram.

FIG. 2 shows a clutch pressure-time diagram 38 and a clutch slip-time diagram 39 of the clutch 9. At moment t0, the clutch 9 is loaded with the pressure p1. The first pressure level p1 results from a characteristic curve. Using said characteristic curve, a pressure value is coordinated with a calculated clutch torque. Said pressure value can be slightly increased, for example, by 0.2 bar as extra security. The clutch torque results from the torque of the input unit 1, converter reinforcement, reduction ratio of the planetary reversing transmission 5 and the reduction ratio of both tapered disc pairs. At the moment t1 the pressure on the clutch 9 is linearly lowered. When the pressure level is p2, at moment t2, the clutch 9 begins to slip. The clutch slip is calculated in the electronic transmission control 3 from the speed values of both speed sensors 30 and 31. The pressure on the clutch 9 is lowered down to the pressure level p3. The pressure level p3 is reached when a preset speed difference n1, for example, 50 revolutions, appears on the clutch 9. In the time period t3 to t4, the pressure level is maintained. At t4, the pressure on the clutch 9 is linearly increased. Due to the pressure increase, the slip on the clutch 9 decreases. Upon reaching the pressure level p5, the speed difference on the clutch 9 is zero. The pressure values p2 and p5 are different. The cause of this is the transition behavior of the clutch 9 when passing from engaged to disengage and disengage to engaged. At moment t6, the clutch 9 is loaded with the pressure value p6. The pressure level p6 results from the corrected characteristic curve and an extra security.

Reference Numerals 1 input unit
2 continuously variable transmission
3. electronic transmission control
4 hydrodynamic converter
5 planetary reversing transmission
6 first tapered disc pair
7 second tapered disc pair
8 traction roller
9 clutch
10 reduction step with differential
11 shaft
12 bridging clutch
13 impeller
14 turbine wheel
15 stator with free wheel
16 planet spider
17 sun wheel
18 sun-wheel shaft
19 first planetary gear
20 second planetary gear
21 ring gear
22 brake
23 clutch
24 first tapered disc, stationary
25 second tapered disc, movable
26 first tapered disc, stationary
27 second tapered disc, movable
28 shaft
29 shaft
30 speed sensor
31 speed sensor
32 transmission output shaft
33 transmission output shaft
34 throttle valve signal
35 engine speed
36 injection time
37 travel position switch
38 clutch pressure-time diagram
39 clutch slip-time diagram

I claim:

1. A regulation process for a continuously variable transmission (2) which has a first pair of tapered discs on an input shaft and a second pair of tapered discs on an output shaft (6 and 7) and a slip clutch (9) protecting the variable transmission from torque shock loads and overload being situated between said second pair of tapered discs (7) and an output side of said variable transmission, said process comprising the steps of:

determining, during operation of said continuously variable transmission (2), an actual slip torque of said clutch (9) by lowering a pressure level of the clutch from a first level (p1) to a second level (p3) which is reached when a presettable speed difference between an input and output of the clutch is detected by means of two speed sensors; and comparing the pressure level difference (p1 minus p3) with a characteristic operating pressure curve to establish a correction value used for adjusting said characteristic curve and securing the transmission against torque shock loads.

2. A regulation process according to claim 1, further comprising the step of forming said characteristic curve from a dependence on clutch pressure of the torque of said clutch (9).

3. A regulation process according to claim 1, further comprising the step of updating said correction value each time a slip in torque is detected.

4. A regulation process according to claim 3, further comprising the step of determining, from a predetermined number of correction values, a representative correction value and depositing the representative correction value in a permanent memory.

5. A regulation process according to claim 1, further comprising the step of, when in a preset number of correction values the correction value exceeds a first positive pressure-limiting value and falls below a second negative pressure-limiting value, depositing a last determined correction value in a permanent memory.

6. A regulation process according to claim 5, further comprising the step of determining, from a predetermined number of correction values, a representative correction value and depositing the representative correction value in a permanent memory.

7. A regulation process according to claim 1, further comprising the step of determining, from a predetermined number of correction values, a representative correction value and depositing the representative correction value in a permanent memory.

* * * * *